United States Patent
Chan et al.

(10) Patent No.: US 10,721,292 B2
(45) Date of Patent: Jul. 21, 2020

(54) SYSTEM AND METHOD FOR PROVIDING USERS FEEDBACK REGARDING THEIR READING HABITS

(71) Applicant: OATH INC., New York, NY (US)

(72) Inventors: Chris Chan, Sunnyvale, CA (US); Tony Hairr, Sunnyvale, CA (US); Shatakshi Goyal, Sunnyvale, CA (US); Clarence Leung, Sunnyvale, CA (US); Katrina Tempero, Sunnyvale, CA (US); Shivakumar Ningappa, Sunnyvale, CA (US)

(73) Assignee: OATH INC., New York, NY (US)

( * ) Notice: Subject to any disclaimer, the term of this patent is extended or adjusted under 35 U.S.C. 154(b) by 0 days.

(21) Appl. No.: 16/037,015

(22) Filed: Jul. 17, 2018

(65) Prior Publication Data
US 2018/0324244 A1    Nov. 8, 2018

Related U.S. Application Data

(63) Continuation of application No. 14/255,576, filed on Apr. 17, 2014, now Pat. No. 10,033,775.

(51) Int. Cl.
*H04L 29/08*    (2006.01)
*G06Q 30/02*    (2012.01)
*G06Q 50/00*    (2012.01)

(52) U.S. Cl.
CPC ......... *H04L 67/10* (2013.01); *G06Q 30/0269* (2013.01); *G06Q 30/0271* (2013.01); *H04L 67/22* (2013.01); *H04L 67/306* (2013.01); *G06Q 50/01* (2013.01)

(58) Field of Classification Search
CPC ....... H04L 67/10; H04L 67/22; H04L 67/306; G06Q 30/0269; G06Q 6050/01
See application file for complete search history.

(56) References Cited

U.S. PATENT DOCUMENTS

| 7,567,958 B1 | 7/2009 | Alspector et al. |
| 9,065,827 B1 | 6/2015 | Taylor et al. |
| 2007/0192310 A1 | 8/2007 | Takagi et al. |

(Continued)

OTHER PUBLICATIONS http://www.ted.com/talks/eli_pariser_beware_online_filter_bubbles_html; Eli Pariser: Beware online "filter bubbles"; TED20119:04Filmed Mar. 2011; 11 pages.

(Continued)

*Primary Examiner* — Azizul Choudhury
(74) *Attorney, Agent, or Firm* — James J. DeCarlo; Greenberg Traurig, LLP

(57) ABSTRACT

Content items are provided to users and their interactions with the provided content items are recorded in respective user profiles. The users' interactions thus recorded over time are analyzed to determine if the users have a balanced information intake. A reading habit score is determined for a user based various criteria. The user's reading habit score is analyzed to determine if the user's habits indicate a balance in the user's content consumption. If the user's reading habit score indicates an imbalance in the user's content consumption, suggestions are provided to the user for achieving a more balanced reading habit and thereby improving the user's reading habit score.

20 Claims, 11 Drawing Sheets

(56) References Cited

U.S. PATENT DOCUMENTS

| | | | |
|---|---|---|---|
| 2011/0010371 A1* | 1/2011 | Xu | G06Q 10/10 |
| | | | 707/749 |
| 2012/0005016 A1 | 1/2012 | Graff | |
| 2014/0040370 A1 | 2/2014 | Buhr | |
| 2014/0229487 A1* | 8/2014 | Mukund | G06Q 50/01 |
| | | | 707/740 |
| 2014/0244426 A1 | 8/2014 | Huang et al. | |

OTHER PUBLICATIONS http://hyperjeff.com/BookHabit BookHabit for iPhone and iPod Touch, by HyperJeff, Inc; 1 page.

* cited by examiner

SYSTEM AND METHOD FOR PROVIDING USERS FEEDBACK REGARDING THEIR READING HABITS

CROSS REFERENCES TO RELATED APPLICATIONS

This application is a continuation of and claims priority from co-pending U.S. patent application Ser. No. 14/255,576, filed on Apr. 17, 2014, entitled "SYSTEM AND METHOD FOR PROVIDING USERS FEEDBACK REGARDING THEIR READING HABITS," the entirety of which is incorporated herein by reference.

BACKGROUND

Modern content providing systems are designed to provide content to users via various electronic devices such as computers, tablet devices and smartphones. Unlike traditional print-based content providing entities such as books or newspapers which were designed only for one way communication, modern content providing devices are configured for two way communications. When a user receives content at an electronic device, the user's review of the provided content can be monitored and the related information can be transmitted back to the content provider by the electronic devices. This led to the development of content personalization systems which were configured to monitor user feedback and provide content tailored to users' preferences.

SUMMARY

This disclosure relates to systems and methods for providing users feedback regarding their reading habits and suggesting actions for improving them. A processor executable method is disclosed in one embodiment. The method comprises providing, by a processor, a plurality of content items to a user and receiving, by the processor, selections of the content items made by the user. Information associated with each of the user selected content items are recorded in a user profile. In an embodiment, the information comprises at least a content category of each of the user selected content items. In one embodiment, the information recorded in the user profile is analyzed and a final score associated with the user's reading habits is determined by the processor based on the analysis. In an embodiment, the final score is indicative of a diversity of content consumed by the user. In one embodiment the diversity of the user's reading habits is determined by the processor based on a minimum threshold number of categories in which the user is a frequent consumer of information. The frequency of the user's information consumption is determined based on a minimum number of content items consumed by the user in each of the content categories in one embodiment. In one embodiment, the user's final score is compared with a predetermined threshold. Based on the comparison, recommendations can be provided to the user for improving his or her final score. A dashboard of the user's reading habits is generated. The dashboard comprises the final score, a frequency of the user's content consumption and categories associated with the user's content consumption. The dashboard thus generated is transmitted for display to the user.

In one embodiment, the dashboard indicates, one or more of the content categories in which the user frequently consumes content. The dashboard can also indicate, one or more of the content categories in which the user infrequently consumes content. Content items are suggested for consumption by the user in the categories where the user infrequently consumes content. In one embodiment, a comparison of the users' score with an average score of the user's social network is also included. The dashboard is also configured to facilitate sharing of the final score by the user with other users.

A computing device comprising a processor and a storage medium for tangibly storing thereon program logic for execution by the processor is disclosed in an embodiment. An apparatus comprising at least one processor and a storage medium for tangibly storing thereon program logic for execution by the processor is disclosed. The program logic comprises providing logic, executed by the processor, to provide a plurality of content items to a user. Receiving logic, is executed by the processor, for receiving selections of the content items made by the user. Information associated with each of the user selected content items is recorded in a user profile by recording logic executed by the processor. In an embodiment, the information comprises at least a content category of each of the user selected content items. Analyzing logic is executed by the processor, to analyze the information recorded in the user profile and based on the analysis, a final score associated with the user's reading habits is determined wherein, the final score is indicative of a diversity of content consumed by the user. Generating logic, is executed by the processor, to generate a dashboard of the user's reading habits. In an embodiment, the dashboard comprises the final score, a frequency of the user's content consumption and categories associated with the user's content consumption. Transmitting logic is executed by the processor, to transmit the generated dashboard to the user. In an embodiment, a diversity of the user's reading habits is determined by the processor based on a minimum threshold number of categories in which the user is a frequent consumer of information. The processor executes indicating logic to indicate on the dashboard, one or more of the content categories in which the user frequently consumes content. Suggesting logic, is also executed by the processor, to suggest content items for consumption by the user in the categories where the user infrequently consumes content.

A computer readable storage medium comprising processor-executable instructions is disclosed in an embodiment. The instructions cause the processor to provide a plurality of content items to a user, receive selections of the content items made by the user, record information associated with each of the user selected content items in a user profile, the information comprises at least a content category of each of the user selected content items. The instructions further cause the processor to analyze the information recorded in the user profile and determine based on the analysis, a final score associated with the user's reading habits, the final score is indicative of a diversity of content consumed by the user. The processor also generates a dashboard of the user's reading habits such that the dashboard comprises the final score, a frequency of the user's consumption of content and categories associated with the user's content consumption. The dashboard is transmitted to the user by the processor. In an embodiment, the computer readable medium of claim further comprises instructions that cause the processor to compare the final score of the user with predetermined threshold criteria and to provide recommendations for the user to improve the final score based on the comparison.

In an embodiment, the instructions cause the processor to include in the dashboard, a comparison of the users' score with an average score of the user's social network. In an embodiment, the dashboard is configured by the processor to facilitate sharing of the final score by the user with other users.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
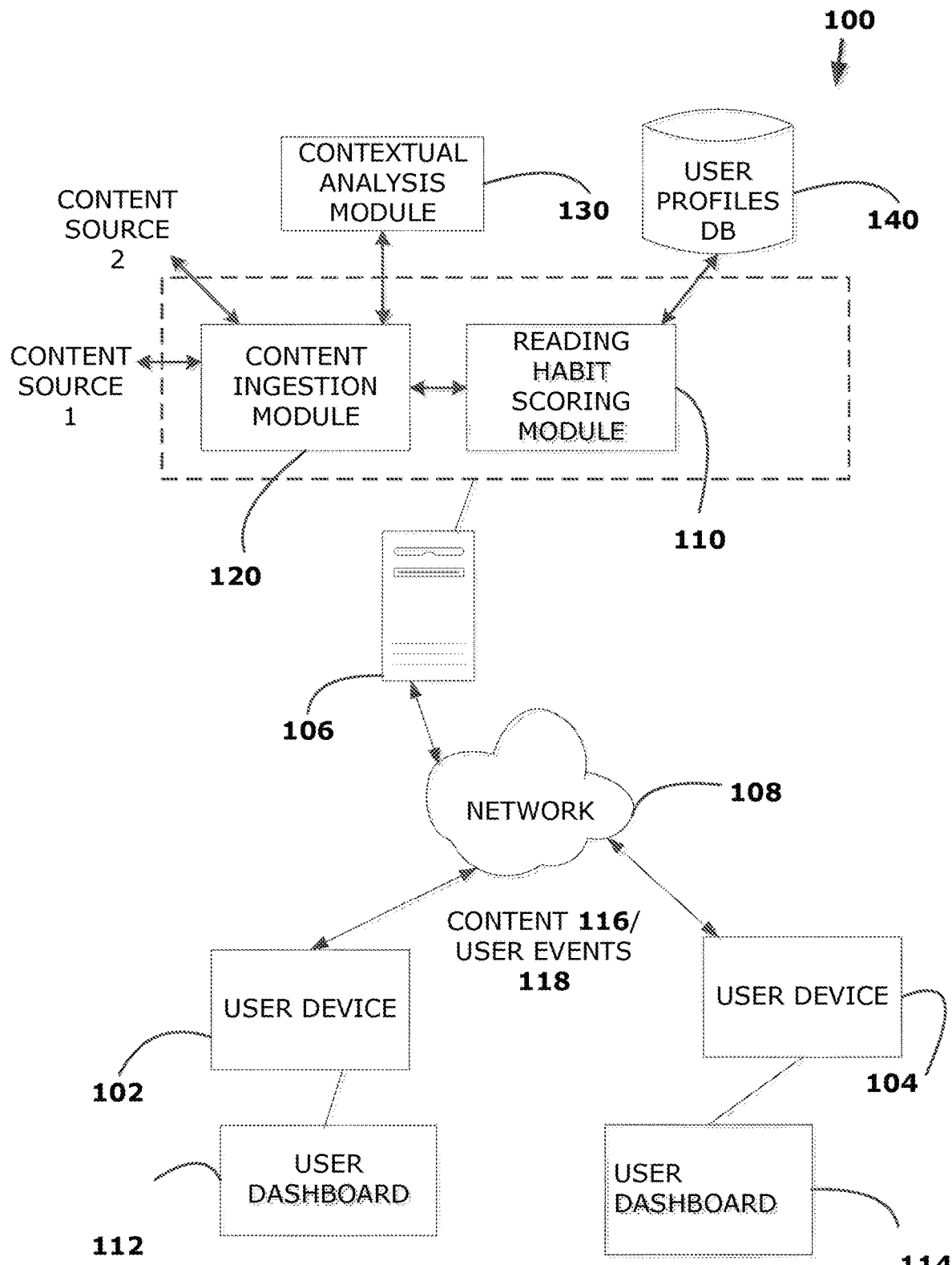
FIG. 1 is a schematic diagram of an information system that provides content and comprising an reading habit scoring module in accordance with one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments of the disclosed subject matter are described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The evolution of communication networks and electronic devices has resulted in the shifting of users from traditional paper-based media such as books and newspapers to electronic devices. This facilitated the content providers to not only provide content but tailor the content to each user's preferences so that two users may receive different content from the same content provider. For example, two users who receive a daily email of the latest headlines in the national/international news from a personalized content providing system may be provided links to different articles presenting the same news item from different viewpoints. In view of their ability to appeal to their audience which results in increased usage and the ease with which electronic content can be manipulated, personalization systems are extensively incorporated into almost all electronic content providing systems, such as news aggregators, search engines, ad-servers and the like.

As web companies strive to tailor their services (including news and search results) to users' personal tastes, there is a dangerous unintended consequence. The users are trapped in a "filter bubble" and as a result, they don't get exposed to information or viewpoints that could challenge or broaden their world view. This can ultimately prove to be bad for the users' personality and bad for democracy in general. Various embodiments described herein are configured to make people aware of the filter bubble by analyzing their information consumption habits or reading habits and displaying the results of such analysis. Additionally, people can be rewarded for consuming diverse information rather than highly personalized content that agrees with their world view. Thus, users are provided with at least some depersonalized content that covers a broad range of topics or content categories or different viewpoints.

FIG. 1 is a schematic diagram of an information system 100 that provides content and comprising an reading habit scoring module 110 in accordance with one embodiment. The information system 100 includes at least a server 106, a plurality of client or user devices such as user device 102 and user device 104 and a network 108 that enables exchange of communications between the server 106 and client devices 102, 104. It may be appreciated that only two client devices 102, 104 are shown for brevity and that any number of client devices can communicate with the server 106 via the network 108. The server 106 comprises a content ingestion module 120 that receives content from various content sources such as content source 1, content source 2 and provides the received content to the users at the various user or client devices 102 and 104. In an embodiment, although the content received from the various content sources may not be personalized to unique user preferences, it can yet be selectively forwarded to the user devices 102 and 104. For example, the received content can be verified for compliance with any format, quality or content restrictions imposed by the content ingestion module 102 prior to being forwarded to the users at their respective devices 102, 104.

In an embodiment, the content received from the various content sources can comprise a plurality of content items each of which can comprise one or more of text, audio, video, or other interactive data. The received content items are analyzed by the contextual analysis module 130 in order to associate various applicable metadata with the content prior to forwarding to the users. By the way of illustration and not limitation, each of the received content items can be analyzed by the content analysis module 130 in order to classify them under appropriate content categories as will be detailed further infra, recognize entities within each of the content items and for verifying if the content items conform to the format and content rules implemented by the content ingestion module 120. For those content items which may be missing the necessary tags, content classification data or other metadata, the contextual analysis module 130 can process such content items to include the appropriate metadata. In an embodiment, the metadata can aid in monitoring user interaction with the content items.

The content items 116 thus processed by the contextual analysis module 130 are provided to the users at their various user devices 102, 104 and the like. By the way of illustration and not limitation, the user devices can include desktop and laptop computers, tablet devices, smartphones, wearable computing devices or other interactive communication devices currently available or to be invented. User interactions with the provided content items such as but not limited to various URL (Universal Resource Locator) events, click, tap or view, delete or other events indicative of user interaction with the content such as voting, forwarding a particular content item to contacts are monitored by the reading habit scoring module 110. The data related to such user events 118 are stored by the reading habit scoring module 110 in the respective user profile stored in the user profiles database 140. In an embodiment, the user profiles database 140 can include profiles of the various users receiving content from the content ingestion module 120. The information in the user profiles may include data that is explicitly provided by the user such as user attributes which may include information regarding the devices at which the user desires to receive content and information implicitly gathered by the reading habit scoring module 110 based on the user behavior or user interactions with the provided content items. In an embodiment, the reading habit scoring module 110 can record attributes of the user behavior such as but not limited to, the number of content items that a particular user is reading, the frequency at which the user accesses the provided content, the various categories associated with the content items reviewed by the user and the type of user event associated with the content items accessed by the user.

The user data thus stored on the user profiles database 140 is analyzed by the reading habit scoring module 110 in order to determine whether the user's reading is indicative of a balanced reading habit. In an embodiment, a user's reading habit is determined to be balanced if the user routinely consumes content in different categories. In an embodiment, a balanced reading habit is detected based on the different categories that are of interest to the user, the number of content items the user reviews in each category and the frequency at which the user reviews the content items of different categories. An aggregated score indicative of the balance in each of the users' reading habit is generated and conveyed to the user via the user dashboard 112 and the dashboard 114. In an embodiment, when a user's score is lower than a predetermined threshold value, the reasons for the low score can be analyzed and appropriate recommendations can be provided to the user for improving the score. The recommended actions can be based on one or more of the aforementioned factors that are used in computing the user's score. The recommendations can include categories, articles and/or information sources which the user can employ in order to improve the user's score.

Figure 2:
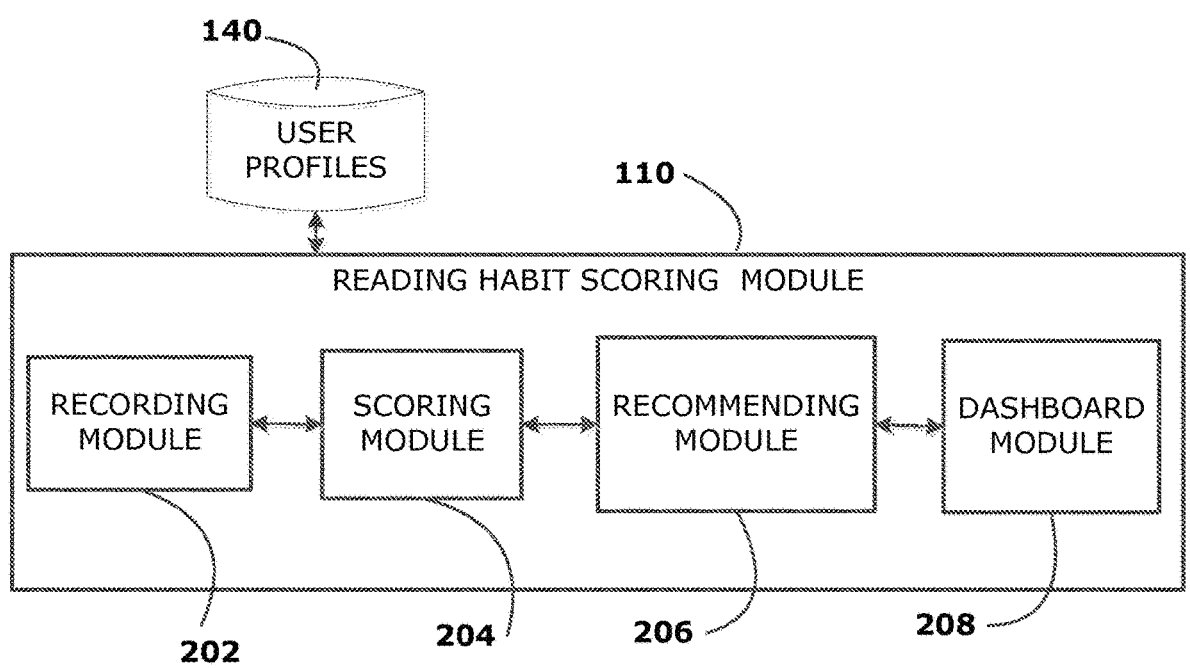
FIG. 2 shows a schematic diagram of the reading habit scoring module in accordance with one embodiment.

FIG. 2 shows a schematic diagram of the reading habit scoring module 110 in accordance with one embodiment. This comprises a recording module 202, scoring module 204, recommending module 206 and dashboard module 208. When a user interacts with the provided content 116, details of the various user interactions 118 are received and are recorded for further analysis by the recording module 202. For example, if the user reviews particular content items of the provided content 116, such user action can be recorded within the user profile 140 in addition to other metadata of the content item such as but not limited to, the category of the content item, the title of the content item, the time at which the user reviewed the content item, the author or source of the content item, keywords or relevant terms associated with the content item. A user's other interactions with the content items such as whether the user forwarded the content item to a contact or whether the user marked that he or she liked/did not like the content item are also recorded by the recording module 202 in the user profile database 140. The recorded information is accessed by the scoring module 204 in order to generate a score for the user. The score is indicative of whether the user is consuming balanced information. A high score is indicative of a balanced reading habit whereas a lower score is indicative that the user is either consuming less information or that the user's reading habit is not balanced and is skewed in favor of one or more content categories. In an embodiment, the scoring module 204 determines the user's score based on the frequency of the user's access of the provided content 116, the amount of content or the number of content categories that the user reviews within a predetermined time period, such as, a week.

The details of the score including the users score under the various criteria as detailed herein are accessed by the recommending module 206. In an embodiment the recommended module 206 compares the user's total score with a predetermined threshold in order to determine the recommendations to be made to the user. In an embodiment if the users score equals or exceeds the threshold, no recommendations are provided to the user and the user is informed that he or she has balanced reading habit. In an embodiment recommendations may be provided to the user for maintenance of the user's balanced reading habit. On the other hand, if the user's score is indicative that the user lacks balance in the information intake, the recommending module 206 is further configured to analyze the user's score in order to determine the recommendations that can be duly provided to the user. In an embodiment if the user's score indicates that the user is consuming less content, then the recommending module 206 can recommend that the user consume more content under categories currently existing in the user's profile. In an embodiment if the user's score indicates that the users is consuming content categories less than a recommended/predetermined minimum number, it indicates that the users diet is not balanced. Therefore, the recommending module 206 can recommend other content categories for the user to review. In an embodiment the other content categories can be selected based on categories popular across the user segments. In further embodiments, the recommending module 206 makes recommendations of the particular content that the user can review in order to improve the user scores. Thus, the recommending module 206 is configured to provide the recommendations based on analysis of the user's score.

The recommendations from the recommending module 206 are provide to the dashboard module 208. The dashboard module 208 is configured to generate a graphical user interface such as, an interactive dashboard 112/114, that conveys the users score and associated recommendations to the user as will be described further herein.

Figure 3:
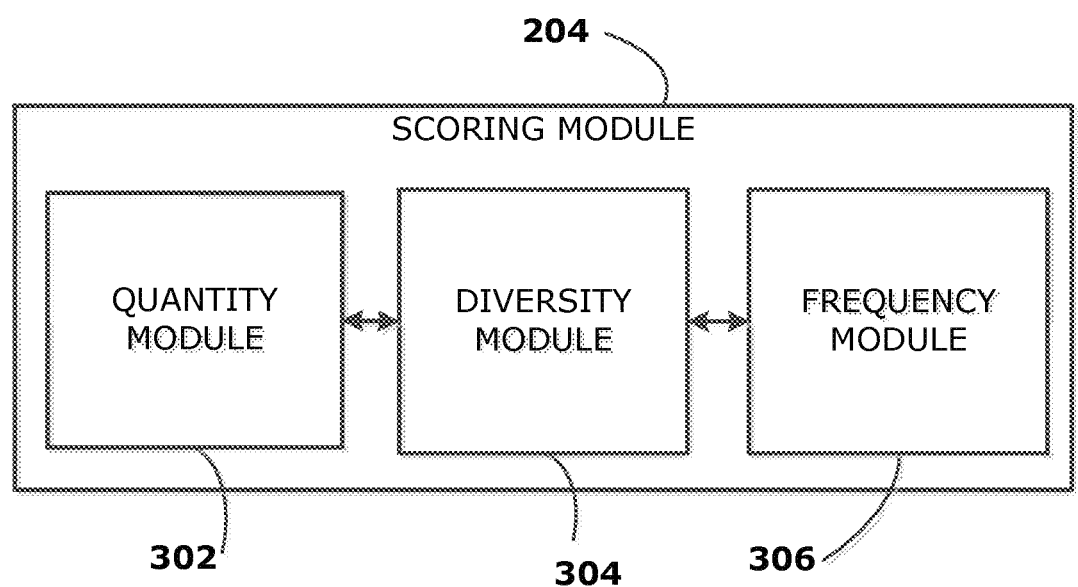
FIG. 3 shows the schematic diagram of the scoring module in accordance with one embodiment.

FIG. 3 shows the schematic diagram of the scoring module 204 in accordance with one embodiment. The scoring module 204 comprises of a quantity module 302, a frequency module 304 and a diversity module 306. In an embodiment, the reading habit score is composed of three components which, in an embodiment, are weighted equally. The three components depend upon the number of articles reviewed by the user as determined by the quantity module 302, the diversity of the articles read or reviewed by the user as determined by the diversity module 304 and the frequency with which the user reads these articles as determined by the frequency module 306.

The quantity module 302 monitors the number of articles that a user reads under each of the categories. The category to which each of the articles or content items reviewed by the user and other details of the articles such as, the information source are recorded by the recording module 202. Based on the recorded metadata, the quantity module 302 can determine the number of articles that the user reads under each of the content categories. Thus, the quantity module 302 is configured to determine the article_read_score of a user. The article read score determines if the user has read enough information within a given time period for example. In an embodiment, the articles_read_score is determined by the quantity module 302 by dividing the number of articles read by the user with the ideal number of articles that the user should read. In an embodiment, the score can range from 0 to 100 where 0 is the lowest score and 100 is the highest score that can be achieved by the user. A score of 100 indicates that the user has reviewed the ideal number of articles if not more. For example,

```
articles_read_score = (num_articles_read_week /
    ideal_num_articles_read_week) *
100
if (articles_read_score > 100) {
articles_read_score = 100
}
```

Thus, if the user reviews 90 content items in a week, and the ideal or recommended number of content items to be reviewed is 100, then:
articles_read_score of the user=(90/100)*100=90.

It can be appreciated that the details of the scoring methodologies are discussed herein only by the way of illustration and not imitation and other scores may be used in other embodiments for determining the quantity of content reviewed by the users.

The diversity module 304 determines the diversity of the information consumed by the user. In an embodiment if the user reads articles associated with later number of categories the user is determined to have a diverse information diet. The diversity score as determined by the diversity module 304 and can range from 0-100, zero being the lowest score and 100 being the highest score. A user who reviews content from only one content category or only one content source can have a diversity score of 0. In an embodiment, a user who reviews equal quantity of content from all content categories can achieve a score of hundred. In an embodiment, a user who reviews a predetermined minimum quantity of content from a predetermined, minimum number of diverse content categories can achieve a score of hundred. For example, a user may achieve a score of hundred if the user reads an article under each of five categories. In an embodiment the categories for high diversity can be based on categories that are popular among the large user segments. Again, it may be appreciated that formula for diversity score is shown herein only by the way of illustration and not limitation and that other formula or methodologies for determining diversity of a user's information diet may also be used by the reading habit scoring module 110 in accordance with embodiments described herein. In an embodiment, the diversity_score can be determined as:
worst_case_standard_dev=standard_deviation (worse_case_data)
actual_standard_dev=standard_deviation (actual_data)
diversity_score=((worst_case_standard_dev-actual_standard_dev)/worse_case_standard_dev)*100

A worst case example of a user's category distribution is shown in below:

| Category | Distribution |
| --- | --- |
| Entertainment | 100% |
| Education | 0% |
| Beauty | 0% |
| Nature and Environment | 0% |
| Sports | 0% | worst_case_standard_dev=standard_deviation(worse_case_data)
worse_case_standard_dev=standard_deviation({100, 0, 0, 0, 0})
worse_case_standard_dev=44.72136

As seen from the above category distribution, the user has no balance in his/her reading habit and exclusively consumes content belonging only to the Entertainment category and does not review content from other categories and therefore the user's diversity score is low. In this case, the user will be recommended that he or she should consume certain minimum amount of content from other content categories. On the other hand shown below is the distribution of a user who has a balanced reading habit as compared to the other user.

| Category | Distribution |
| --- | --- |
| Entertainment | 20% |
| Education | 30% |
| Beauty | 10% |
| Nature and Environment | 10% |
| Sports | 30% | actual_data={20, 30, 10, 10, 30}
actual_standard_dev=standard_deviation (actual_data)
actual_standard_dev=standard_deviation({20, 30, 10, 10, 30})
actual_standard_dev=10
diversity_score=((44.72136 10)/44.72136)*100)
diversity_score=77.639

The user consumes a varied content diet and hence, the user achieves a high diversity score of 77 percent. The diversity module 304 thus determines the diversity in the users' information based on the various categories associated with the content that the user reviews.

The frequency module 306 determines the frequency with which the user reviews content. The frequency score is indicative how often the user reviews the content provided to him. This is the third component of the reading habit score. In an embodiment,
frequency_score=(num_days_read/7)*100

In an embodiment the frequency score can range from 0 to 100 wherein a user who achieves a score of hundred would have periodically reviewed the recommended number of content items in a given time period. A user who has not reviewed any articles within a pre-determined time period, for example, a week would achieve a score of 0. If the user read articles three days of the week, then the user's frequency score would be 42% as shown below:

num_days_read=3//User read articles three days this week
frequency_score=(3/7)*100
frequency_score=42.85

Figure 4:
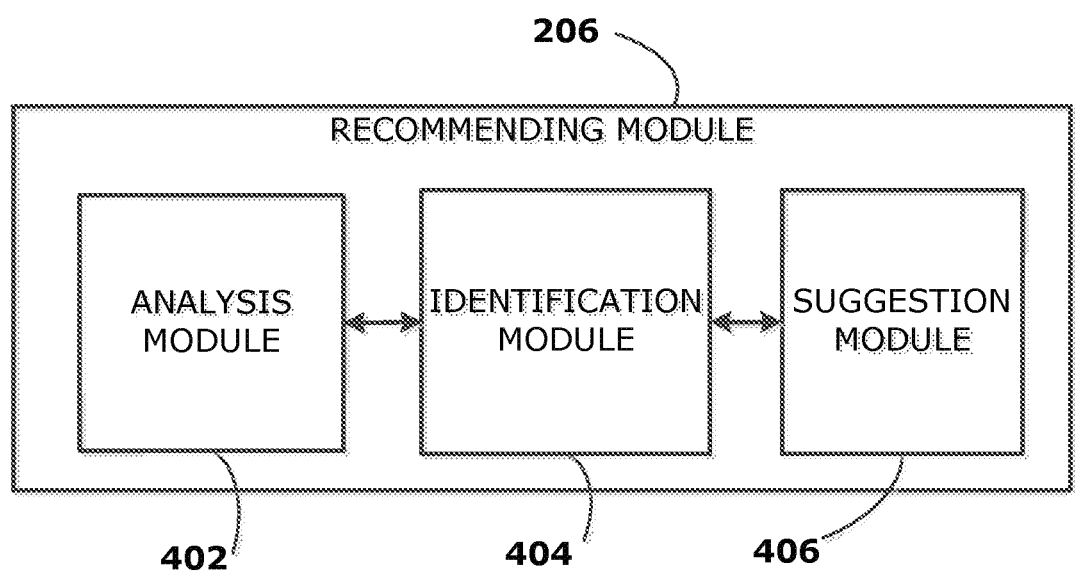
FIG. 4 shows the detailed illustration of the recommending module in accordance with one embodiment.

As described supra, the reading habit score of a user is based at least on three component scores, the article score, the diversity score and the frequency score. Therefore, further recommendations can be made to the user regarding his or her reading habits based on the values of the three component scores of a user. FIG. 4 shows the detailed illustration of the recommending module 206 in accordance with one embodiment. It comprises of an analysis module 402, an identification module 404 and a suggestion module 406. The reading habit score as generated by the scoring module 204 is received by the recommending module 206. Based on the reading habit score and the components of the reading habit score the recommending module 206 can provide recommendations of the various actions that the user can take in order to improve his/her reading habit score. In an embodiment the analysis module 402 of the recommending module 206 analyzes the various components of the reading habit scores. In an embodiment, the analysis module 402 compares each of the components of the reading habit score to a respective pre-determined threshold score in order to determine if the user meets the recommended criteria for that component. For example each of the article_read_score, the diversity_score and the frequency_score can be compared with respective pre-determined thresholds.

The components wherein the user does not meet the criteria are identified and transmitted to the identification module 404. In an embodiment the identification module 404 identifies actions that can be taken by the user for improving the score. In an embodiment if the user does not meet the criteria associated with the quantity under a certain category then such deficiency is identified via the users are article_read_score by the analysis module 402. This information is transmitted to the identification module 404 which identifies that the user should read more articles or review more content associated with certain content category. In an embodiment if the user does not meet the criteria associated with diversity, then such deficiency is identified via the user's diversity_score. The identification module 404 therefore identifies that the user should read articles or review content from additional content categories. In an embodiment if the user does not meet the criteria associated with frequency, then such deficiency is identified via the user's frequency_score and the identification module 404 identifies that the user should read articles or review content more frequently.

Based on the actions from the identification module 404, the suggestion module 406 provides suggestions for one or more of content items or content categories for the user to review in order to improve his/her reading habit score. In an embodiment, the suggestion module 406 can suggest for user review additional categories selected from the top N (N is a whole number) categories popular among all the users of the information system 100. In an embodiment, the suggestion module 406 can suggest for user review, additional content among the content categories currently being reviewed by the user. It may be appreciated that if more than one component of the reading habit score of a user fails to meet the predetermined criteria, the recommending module 206 can correspondingly recommend more than one action to the user. In an embodiment if a user's reading habit score meets all of the recommended criteria no recommendations may be provided by the recommending module 206.

Figure 5:
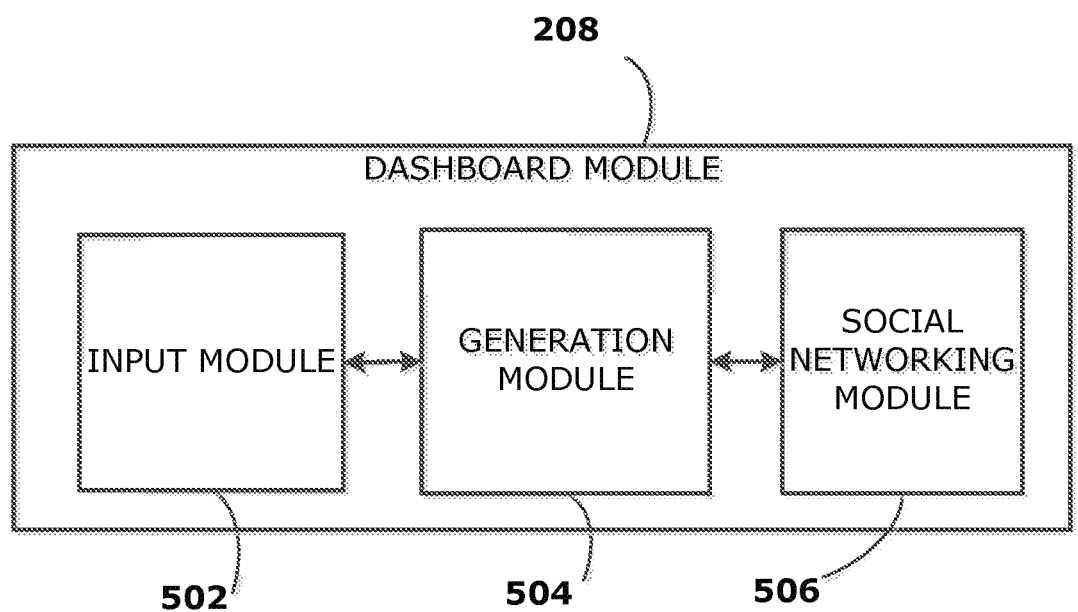
FIG. 5 shows a schematic diagram of the dashboard module in accordance with one embodiment.

FIG. 5 shows a schematic diagram of the dashboard module 208 in accordance with one embodiment. The dashboard module 208 comprises an input module 502, a generation module 504 and a social networking module 506. The input module 502 receives the reading habit score from the scoring module 204 and the latest recommendation from the recommending module 206. The information thus received is provided to the generation module 504. In an embodiment the generation module 504 provides the numerical value of the reading habit score to the user. In addition, the generation module 504 can also generate a textual description of the users reading habit score, as will be detailed further herein. In an embodiment, the generation module 504 graphs the user's consumption or diet under the various categories and provides an interactive dashboard to the user. The dashboard can comprise links for content items recommended to the user in order to improve the users score. Furthermore, the generation module 504 receives input from the social networking module 506 for inclusion in the dashboard. In an embodiment the user can elect to share his/hers reading habit score with his/her social network. In addition to sharing their own reading habit score, the users can monitor other users' diet scores. Thus the information system 100 as detailed herein provided further interactivity and also provides opportunities for social contact between the users and in addition to providing balanced information diet. In an embodiment, the information system 100 can reward a user for achievements related to the reading habit score. For example, a user can be provided with rewards such as but not limited to, additional bonus material, access to premium services, discounts or coupons. Users may be rewarded for achievements such as but not limited to, maintaining a high reading habit score for a certain time interval, reaching high numbers for the reading habit score as compared to the user's social network or the user population of the information system, or for reaching particular thresholds with respect to one or more of the article_read_score, the diversity_score and the frequency_score. In an embodiment, a user who achieves certain milestones in terms of the reading habit score can receive virtual badges or titles that can be displayed within the user's social network.

Figure 6:
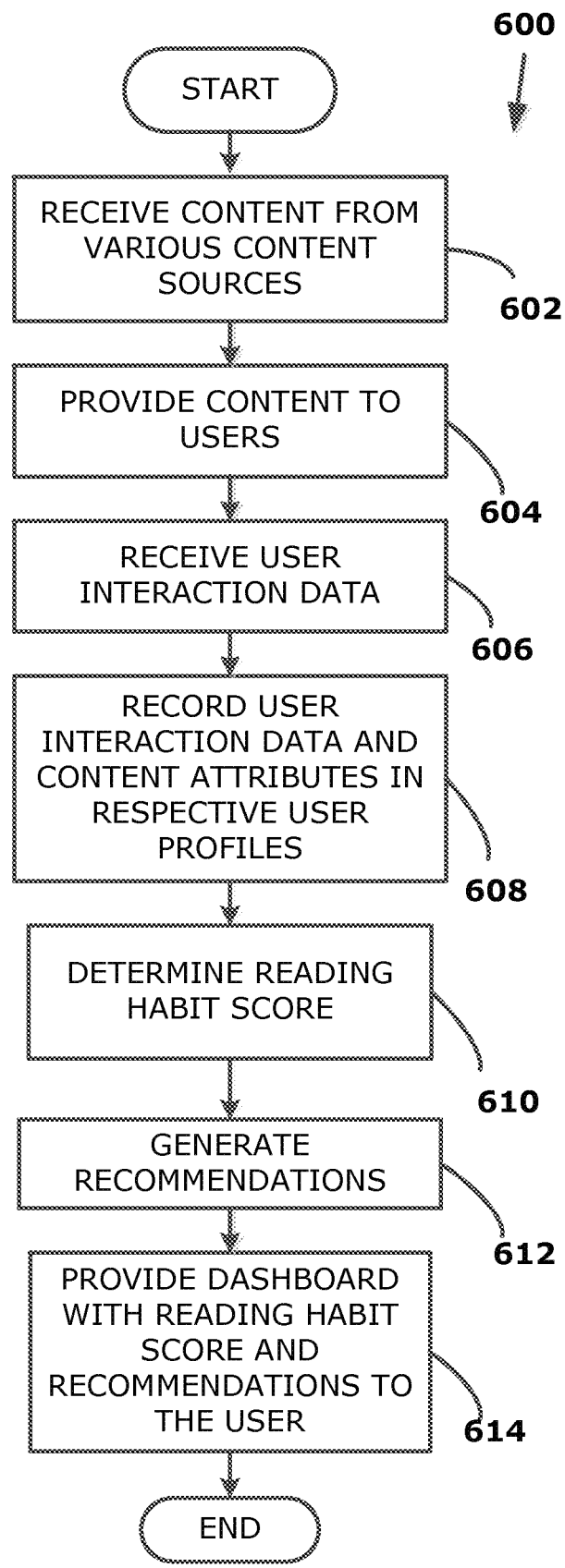
FIG. 6 is a flowchart that details the steps of the methodology to determine if a user's reading habit is balanced and to provide related recommendations in accordance with one embodiment.

FIG. 6 is a flowchart 600 that details the steps of the methodology to determine if a user's information diet is balanced and to provide related recommendations in accordance with one embodiment. The method begins at 602 wherein content is received from the various content sources. At 604, the received content is provided to the users of the information system 100. In an embodiment, users may be provided with personalized content based on the user's explicit choices or based on the behavior of users that was implicitly observed by the information system 100 in accordance with methodologies known in the art. In an embodiment, users can be provided with content that is not personalized to the user's preferences but is generally provided to all the users of the information system 100. In an embodiment, the users may be provided with content associated with a plurality of content categories. In an embodiment, the plurality of content categories can include education, beauty, arts and entertainment, politics and government, nature and environment, technology and electronics, society and culture, health, finance, family and relationships, science, hobbies and activities, food and cooking, business, sports, transportation, humanities and the like. It may be appreciated that the content categories are listed herein only by the way of illustration and not limitation and that there may be other definitions of the content categories. Content items can be categorized for example, based on further subdivisions in the aforementioned content categories, formats of the content items such as video, audio, text or even particular file formats and authors or sources of content.

At 606, the user interactions with the provided content 116 are received. The received user interactions and associated content attributes are recorded in respective user profiles are shown at the 608. In an embodiment, user interactions such as reading the content item, forwarding the content item to contacts, providing the review or opinion on the content item, deleting the content item or other interactions are recorded in respective user profiles. In addition, content attributes or metadata to content item the user interacted with is also recorded in respective user profile at 608. At 610, the reading habit score of the user is determined in accordance with embodiments described herein. At 612, the user's reading habit score is analyzed and recommendations are generated for forwarding to the user. The reading habit score and the recommendations thus generated are provided to the user via an interactive dashboard as shown at 614. This can help the user to determine if he or she is receiving a balanced reading habit.

Figure 7:
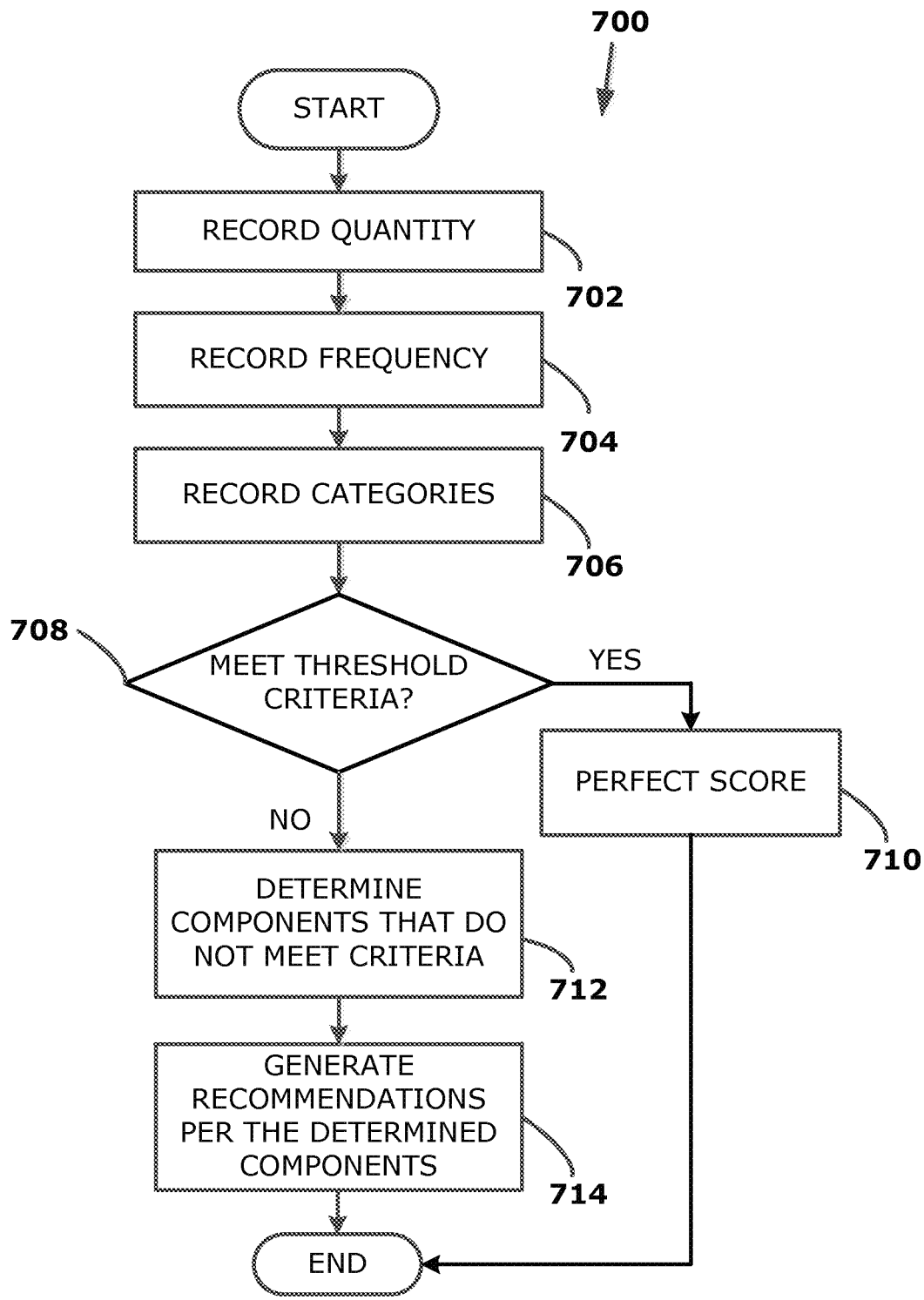
FIG. 7 is a flowchart that details the steps of the methodology of providing content recommendations to the user in accordance with one embodiment.

FIG. 7 is a flowchart 700 that details the steps of the methodology of providing content recommendations to the user in accordance with one embodiment. The method begins at 702 wherein the quantity of content consumed by the user is recorded. At 704, the frequency of content consumption of the user is recorded. In an embodiment, the frequency of content consumption can be determined based on the time(s) at which the user reviews or reads the provided content 116. The categories associated with the various content items that the user interacted with are recorded as shown at 706. At 708, it is determined if each of the quantity, frequency and categories associated with the content reviewed or read by the user meets respective threshold criteria. If yes, the method moves to 710 wherein it is determined that the user has perfect reading habit score which implies that the user is consuming a balanced reading habit and hence no recommendations are required. Therefore, the method terminates on the end block. If it is determined at 708 that the user's reading habit score does not meet the threshold criteria, the method proceeds to step 712. At step 712, the components of the reading habit score that do not meet the threshold criteria are determined in accordance with embodiments described herein. Based on the determination made at step 712, the recommendations are generated at step 714 for improving the user's reading habit score. By following the recommendations the user can ensure that he or she receives a more balanced information diet.

Figure 8:
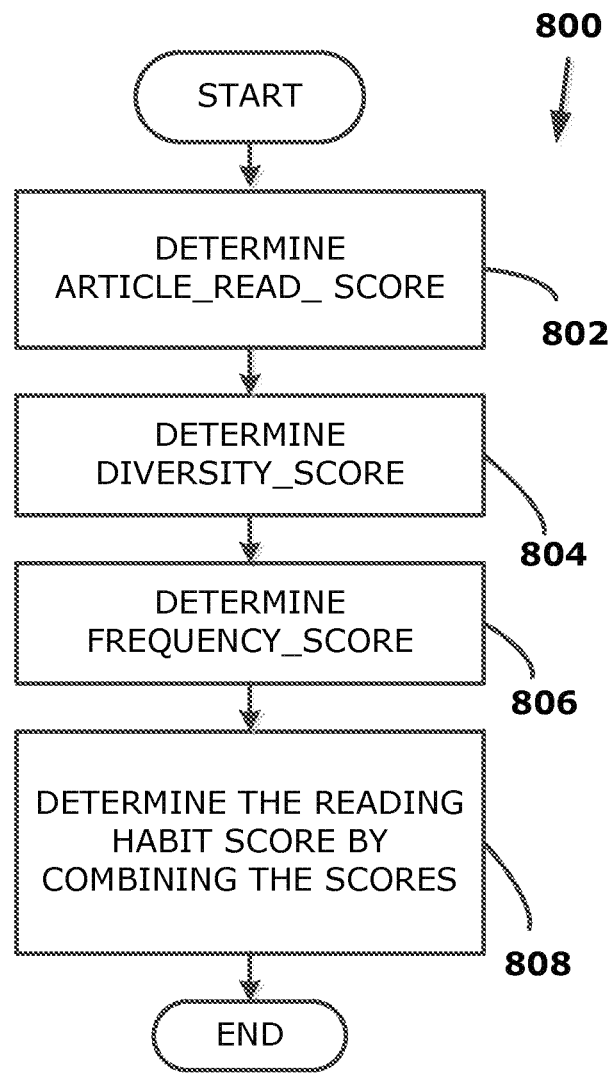
FIG. 8 is a flowchart that shows the steps of methodology to determine the reading habit score in accordance with one embodiment.

FIG. 8 is a flowchart 800 that shows the steps of methodology to determine the reading habit score in accordance with one embodiment. The method begins at 802 wherein the article_read_score is determined. This indicates if a user has read adequate quantity of content in a given time interval. In an embodiment, the maximum score that can be achieved by a user is 100. At 804, the diversity_score of the user's information diet is determined. The diversity_score determines if the user is consuming content from a plurality of content categories. In an embodiment the diversity_score can range from 0 to 100 such that a user who regularly consumes content from only one content category receives a low score whereas a user who routinely consumes content from different content categories can achieve a higher score. At 806, the frequency_score of the user is determined. The frequency_score indicates how often the user reads articles provided by the information system 100. At 808, the article_read_score, the diversity_score and the frequency_score are combined to generate the reading habit score of the user. In an embodiment, all the component scores are weighted equally in the reading habit score.

Figure 9:
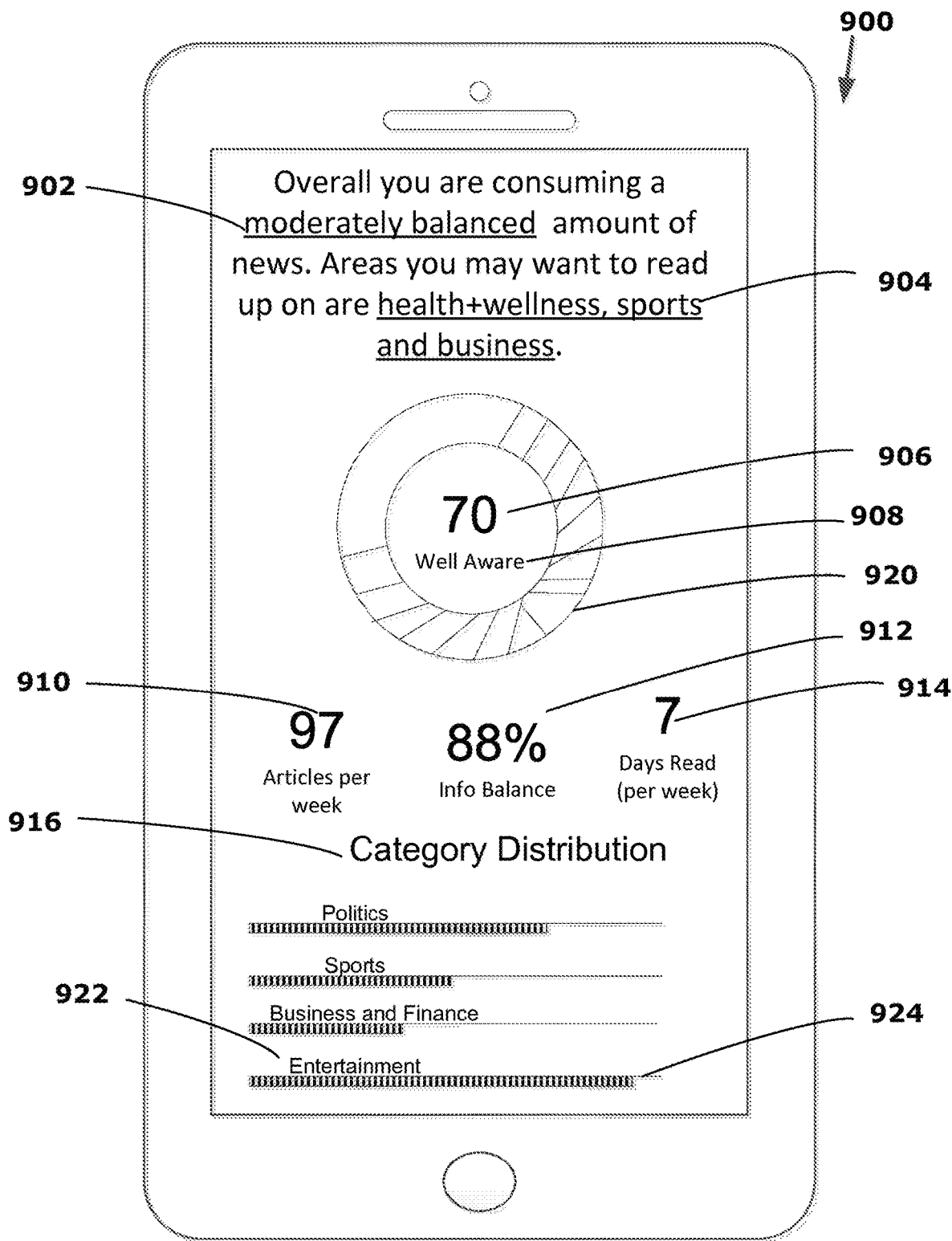
FIG. 9 is a schematic diagram of a dashboard generated in accordance with one embodiment.

FIG. 9 is a schematic diagram of a dashboard 900 generated in accordance with one embodiment. The dashboard 900 shows that the user has a moderately balanced reading habit of news. In addition, the dashboard 900 includes suggestions 904 on the categories of information recommended to the user. The dashboard 900 comprises a textual description 908 of the user's reading habit score 906. The user's reading habit score 906 is also conveyed via a graph 920. The dashboard 900 also conveys that the user reads 97 articles a week as shown at 910 seven days a week as shown at 914. The user's score of 88 percent shown at 912 indicates that the user has a fairly balanced information consumption habit. The dashboard 900 also includes category distribution section 916 that shows the content categories reviewed by the user at 922 and the amount of content consumed under each category is shown graphically at 924. It also shows that the user predominantly reads articles from the entertainment category. The user also consumes content from the politics category. However, the user's consumption habits associated with content under sports, business and finance warrant improvement. Moreover, the dashboard 900 shows that the user is not consuming content related to health category. Accordingly at 904, it is suggested that the user should review content from these categories in order to improve his or her reading habit score 906. It may be appreciated that the details of the dashboard 900 are described only by the way of illustration and not limitation and that other elements, such as social networking or gamification elements can be incorporated into the dashboard 900 in accordance with embodiments described herein.

Figure 10:
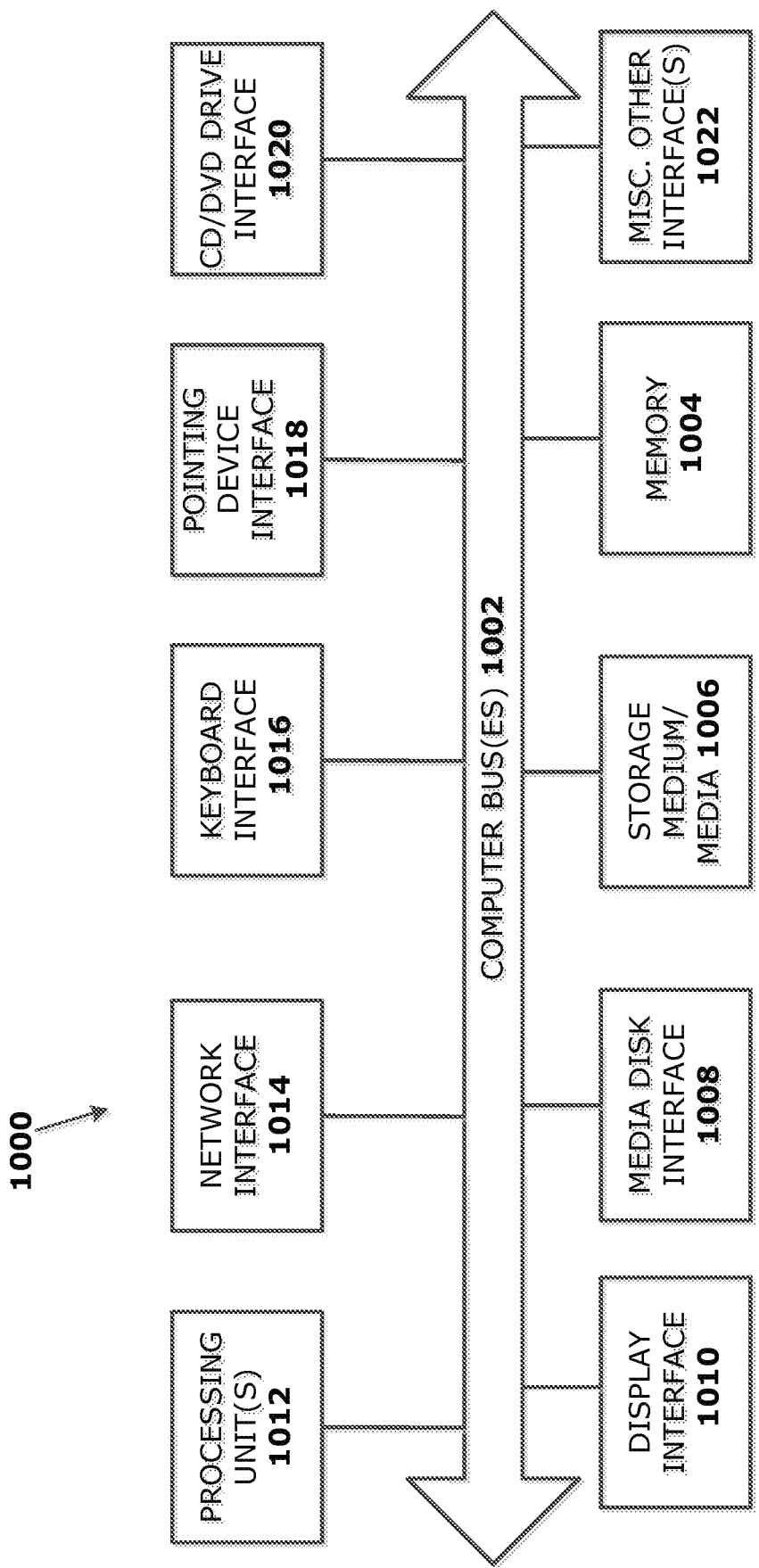
FIG. 10 illustrates internal architecture of a computing device in accordance with embodiments described herein.

As shown in the example of FIG. 10, internal architecture of a computing device 1000 includes one or more processing units (also referred to herein as CPUs) 1012, which interface with at least one computer bus 1002. Also interfacing with computer bus 1002 are persistent storage medium/media 1006, network interface 1014, memory 1004, e.g., random access memory (RAM), run-time transient memory, read only memory (ROM), etc., media disk drive interface 1008, an interface 1020 for a drive that can read and/or write to media including removable media such as floppy, CD-ROM, DVD, etc., media, display interface 1010 as interface for a monitor or other display device, keyboard interface 1016 as interface for a keyboard, pointing device interface 1018 as an interface for a mouse or other pointing device, and miscellaneous other interfaces 1022 not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code or logic, and/or computer-executable process steps, incorporating functionality described herein, e.g., one or more of process flows described herein. CPU 1012 first loads computer-executable process steps or logic from storage, e.g., memory 1004, storage medium/media 1006, removable media drive, and/or other storage device. CPU 1012 can then execute the stored process steps in order to execute the loaded computer-executable process steps. Stored data, e.g., data stored by a storage device, can be accessed by CPU 1012 during the execution of computer-executable process steps.

Persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, metadata, playlists and other files. Persistent storage medium/media 1006 can further include program modules/program logic in accordance with embodiments described herein and data files used to implement one or more embodiments of the present disclosure.

Figure 11:
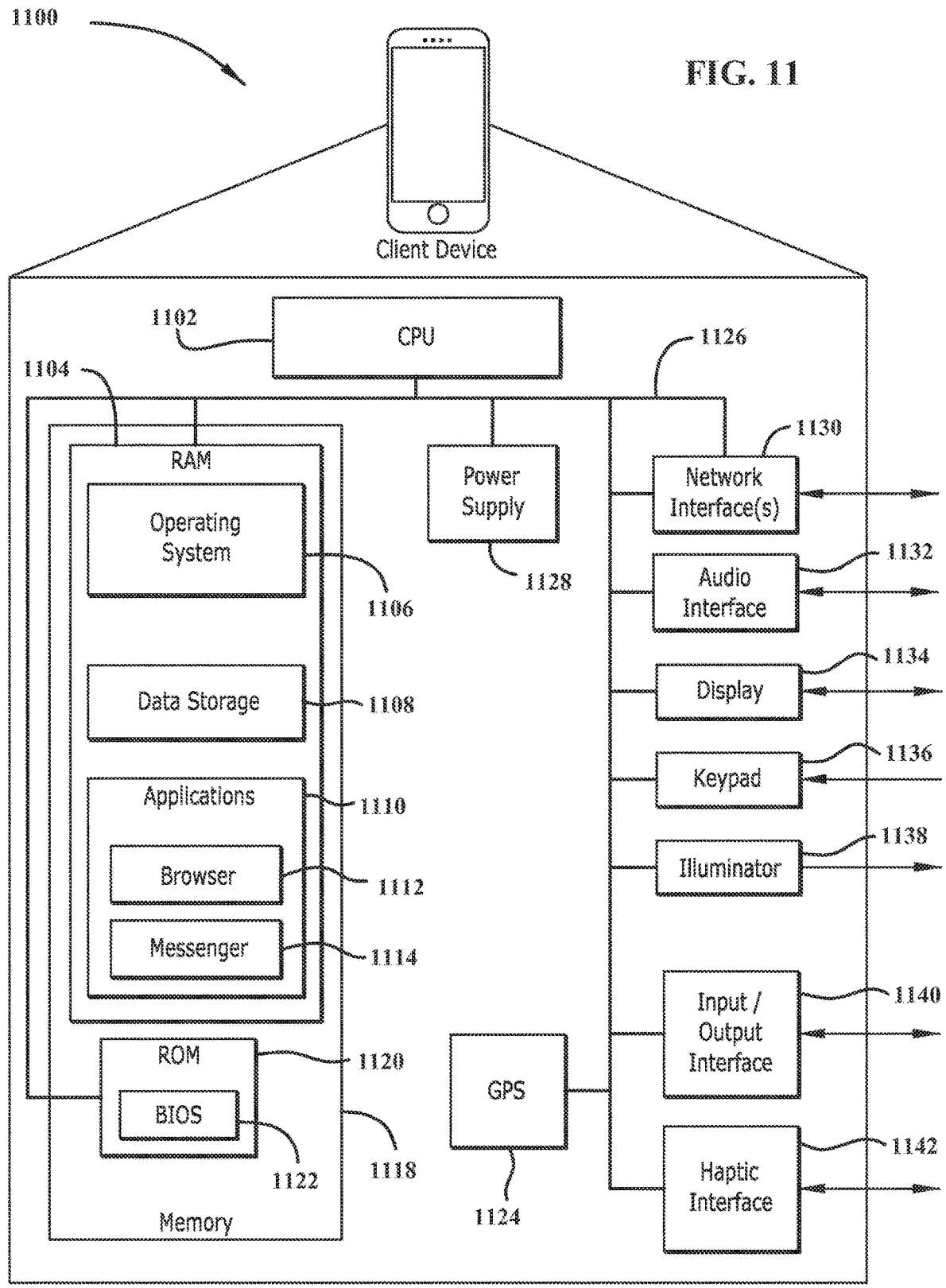
FIG. 11 is a schematic diagram illustrating a client device implementation of a computing device in accordance with embodiments of the present disclosure.

FIG. 11 is a schematic diagram illustrating a client device implementation of a computing device in accordance with embodiments of the present disclosure. A client device 1100 may include a computing device capable of sending or receiving signals, such as via a wired or a wireless network, and capable of running application software or "apps" 1110. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device or a user device can include standard components such as a CPU 1102, power supply 1128, a memory 1118, ROM 1120, BIOS 1122, network interface(s) 1130, audio interface 1132, display 1134, keypad 1136, illuminator 1138, I/O interface 1140 interconnected via circuitry 1126. Claimed subject matter is intended to cover a wide range of potential variations. For example, the keypad 1136 of a cell phone may include a numeric keypad or a display 1134 of limited functionality, such as a monochrome liquid crystal display (LCD) for displaying text. In contrast, however, as another example, a web-enabled client device 1100 may include one or more physical or virtual keyboards 1136, mass storage, one or more accelerometers, one or more gyroscopes, global positioning system (GPS) 1124 or other location identifying type capability, Haptic interface 1142, or a display with a high degree of functionality, such as a touch-sensitive color 2D or 3D display, for example. The memory 1118 can include Random Access Memory 1104 including an area for data storage 1108.

A client device 1100 may include or may execute a variety of operating systems 1106, including a personal computer operating system, such as a Windows, iOS or Linux, or a mobile operating system, such as iOS, Android, or Windows Mobile, or the like. A client device 1100 may include or may execute a variety of possible applications 1110, such as a client software application 1114 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1100 may also include or execute an application to communicate content, such as, for example, textual content, multimedia content, or the like. A client device 1100 may also include or execute an application to perform a variety of possible tasks, such as browsing 1112, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
providing, by a processor over a network, a plurality of content items to a user device of a user;
recording, by the processor, a quantity, a frequency and categories associated with content of the plurality of content items consumed by the user via the user device;
determining, by the processor, a reading habit score of the user based on the recorded quantity, frequency and categories; and
determining, by the processor, whether each component of the reading habit score meets a respective threshold criteria:
when all threshold criteria are determined to be met, terminating, by the processor, the method; and
when at least one component of the reading habit score does not meet the respective threshold criteria,
identifying, by the processor, the at least one component that does not meet the respective threshold criteria;
generating, by the processor, based on the identification and the determined reading habit score, recommendations to the user to improve the reading habit score component; and
providing, by the processor over the network, the generated recommendations to the user.

2. The method of claim 1, wherein the frequency associated with the content of the plurality of content items consumed by the user is determined based on times at which the user reviews the provided plurality of content items.

3. The method of claim 1, wherein the recommendations comprising suggestions of various actions that the user can take to improve the reading habit score.

4. The method of claim 1, wherein determining if each component of the reading habit score meets the respective threshold criteria comprises comparing each component of the reading habit score to a respective pre-determined threshold score.

5. The method of claim 1, when a quantity under a content category associated with the content of the plurality of content items consumed by the user does not meet the respective threshold criteria:
identifying, by the processor, a deficiency of the quantity under the content category via a quantity score; and
identifying, by the processor, that the user should review more content associated with the content category.

6. The method of claim 1, when a diversity of the categories associated with the content of the plurality of content items consumed by the user does not meet the respective threshold criteria:
identifying, by the processor, a deficiency of the diversity via a diversity score; and
identifying, by the processor, that the user should review content from additional content categories.

7. The method of claim 6, wherein generating the recommendations to the user to improve the reading habit score comprises suggesting, for user review, the additional content categories selected from top N categories popular among all users of an information system, N being a whole number.

8. The method of claim 1, wherein generating the recommendations to the user to improve the reading habit score comprises suggesting for user review the additional content among the categories associated with the content of the plurality of content items currently being reviewed by the user.

9. The method of claim 1, when the frequency associated with the content of the plurality of content items consumed by the user does not meet the respective threshold criteria:
identifying, by the processor, a deficiency of the frequency via a frequency score; and
identifying, by the processor, that the user should review content more frequently.

10. The method of claim 1, when more than one component of the reading habit score do not meet the respective threshold criteria, recommending, by the processor, more than one action to the user.

11. The method of claim 1, wherein providing the generated recommendations to the user is by providing a dashboard comprising links for content items recommended to the user.

12. An apparatus comprising:
at least one processor; and
a non-transitory computer-readable storage medium tangibly storing thereon program logic for execution by the processor, the program logic comprising:
logic executed by the processor for providing, over a network, a plurality of content items to a user device of a user;
logic executed by the processor for recording a quantity, a frequency and categories associated with content of the plurality of content items consumed by the user via the user device;
logic executed by the processor for determining a reading habit score of the user based on the recorded quantity, frequency, and categories; and
logic executed by the processor for determining whether each component of the reading habit score meets a respective threshold criteria:
logic executed by the processor for terminating the method when all threshold criteria are met;
logic executed by the processor for identifying, when all of the threshold criteria are not met, the at least one component that does not meet the respective threshold criteria; and
logic executed by the processor for generating based on the identification and the determined reading habit score, recommendations to the user to improve the reading habit score component; and
logic executed by the processor for providing, over the network, the generated recommendations to the user.

13. The apparatus of claim 12, the program logic further comprising:
when a quantity under a content category associated with the content of the plurality of content items consumed by the user does not meet the respective threshold criteria:
logic executed by the processor for identifying a deficiency of the quantity under the content category via a quantity score; and
logic executed by the processor for identifying that the user should review more content associated with the content category.

14. The apparatus of claim 12, the program logic further comprising:
when a diversity of the categories associated with the content of the plurality of content items consumed by the user does not meet the respective threshold criteria:

deficiency identification logic executed by the processor for identifying a deficiency of the diversity via a diversity score; and diversity identification logic executed by the processor for identifying that the user should review content from additional content categories.

15. The apparatus of claim 12, the program logic further comprising:

when the frequency associated with the content of the plurality of content items consumed by the user does not meet the respective threshold criteria:

deficiency identification logic executed by the processor for identifying a deficiency of the frequency via a frequency score; and frequency identification logic executed by the processor for identifying that the user should review content more frequently.

16. The apparatus of claim 12, wherein the recommendation providing logic comprises dashboard providing logic executed by the processor for providing a dashboard comprising links for content items recommended to the user.

17. A non-transitory computer readable storage medium tangibly storing thereon program instructions, that when executed by a processor, cause the processor to perform a method, comprising:

providing, over a network, a plurality of content items to a user device of a user;

recording a quantity, a frequency and categories associated with content of the plurality of content items consumed by the user via the user device;

determining a reading habit score of the user based on the recorded quantity, frequency, and categories; and determining whether each component of the reading habit score meets a respective threshold criteria:

when all threshold criteria are determined to be met, terminating the method;

when at least one component of the reading habit score does not meet the respective threshold criteria, identifying the at least one component that does not meet the respective threshold criteria; and generating based on the identification and the determined reading habit score, recommendations to the user to improve the reading habit score component; and providing, over the network, the generated recommendations to the user.

18. The non-transitory computer readable medium of claim 17, further comprising:

when a quantity under a content category associated with the content of the plurality of content items consumed by the user does not meet the respective threshold criteria:

identifying a deficiency of the quantity under the content category via a quantity score; and identifying that the user should review more content associated with the content category.

19. The non-transitory computer readable medium of claim 17, further comprising:

when a diversity of the categories associated with the content of the plurality of content items consumed by the user does not meet the respective threshold criteria:

identifying a deficiency of the diversity via a diversity score; and identifying that the user should review content from additional content categories.

20. The non-transitory computer readable medium of claim 17, further comprising:

when the frequency associated with the content of the plurality of content items consumed by the user does not meet the respective threshold criteria:

identifying a deficiency of the frequency via a frequency score; and identifying that the user should review content more frequently.

* * * * *